United States Patent
Uekado et al.

(10) Patent No.: US 6,355,700 B1
(45) Date of Patent: Mar. 12, 2002

(54) FOAMED THERMAL INSULATING MATERIAL AND INSULATED STRUCTURE

(75) Inventors: Kazutaka Uekado, Hyogo; Yoshiyuki Tsuda, Osaka; Hideo Nakamoto, Osaka; Tomohisa Tenra, Osaka, all of (JP)

(73) Assignee: Matsushita Refrigeration Company, Osaka (JP)

( * ) Notice: Subject to any disclaimer, the term of this patent is extended or adjusted under 35 U.S.C. 154(b) by 0 days.

(21) Appl. No.: 09/301,960

(22) Filed: Apr. 29, 1999

Related U.S. Application Data

(63) Continuation of application No. 08/682,677, filed as application No. PCT/JP94/01984 on Nov. 24, 1994, now Pat. No. 5,983,647.

(51) Int. Cl.$^7$ .............................................. C08G 18/04
(52) U.S. Cl. ........................ 521/107; 521/137; 521/163; 521/170; 521/174
(58) Field of Search ............................... 521/137, 163, 521/107, 170, 174

(56) References Cited

U.S. PATENT DOCUMENTS

| | | | | |
|---|---|---|---|---|
| 4,945,119 A | * | 7/1990 | Smits et al. | 521/131 |
| 4,996,242 A | * | 2/1991 | Lin | 521/131 |
| 5,728,746 A | * | 3/1998 | Sicken | 521/169 |

\* cited by examiner

*Primary Examiner*—John M. Cooney, Jr.
(74) *Attorney, Agent, or Firm*—Wood, Phillips, VanSanten, Clark & Mortimer

(57) ABSTRACT

An insulated structure is formed by injection of a foamed thermal-insulating material created by foaming into a space between a plastic board and metal plate with a disposition of copper pipes. A non-halogenated organophosphorus compound having a molecular weight over 150 as an additive with an OH group as a functional group is mixed with the raw materials of the foamed thermal-insulating material including polyol, a foam stabilizer, a catalyst, a foaming agent having at least one component of hydrocarbon, and an organic polyisocyanates. By adding a non-halogenated organophosphorus compound, which has a molecular weight over 150 as an additive with an OH group as a functional group, the burning rate of the foamed thermal-insulating material becomes the same as that of the foamed thermal-insulating material which uses CFC11 as a foaming agent. Also, the possibilities of phosphor corrosion by free ionization to copper pipes, which are disposed inside of the insulated structure, are eliminated and phosphorus transfer to the plastic board and worries of food contamination are also eliminated.

12 Claims, 1 Drawing Sheet

FOAMED THERMAL INSULATING MATERIAL AND INSULATED STRUCTURE

CROSS-REFERENCE TO RELATED APPLICATIONS

This application is a continuation of U.S. application Ser. No. 08/682,677, filed Jul. 24, 1996, now U.S. Pat. No. 5,983,647 which is a §371 of International Application No. PCT/JP94/01984, filed Nov. 24, 1994.

FIELD OF THE INVENTION

The present invention relates to a foamed thermal-insulating material used in insulating devices such as refrigerators, freezers, etc. and to an insulated structure utilizing the foamed thermal-insulating material.

BACKGROUND OF THE INVENTION

Recently, environmental issues such as the destruction of the ozone layer and global warming, which are influenced by Chloro Fluoro Carbons (CFCs), are receiving close attention. For this reason, reduction in the use of CFCs as a foaming agent has become a very important issue.

Therefore, since hard urethane foam is the leading foamed thermal-insulating material, it is proposed to use a hydrocarbon foaming agent which does not include a halogen molecule.

However, a hydrocarbon is not easily applied as a foaming agent because of combustibility safety, thermal-insulating efficiency quality, and so on. Further, a foamed thermal-insulating material made using a hydrocarbon as a foaming agent is less effective than the foamed thermal-insulating material made by using the present CFC11 foaming agent.

SUMMARY OF THE INVENTION

Concerning the above mentioned problem, the present invention aims to provide the foamed thermal-insulating material and the insulated structure filled with the foamed thermal-insulating material that are not inferior to the present foamed thermal-insulating material made by using the CFC11 foaming agent in terms of combustibility safety, thermal-insulating efficiency quality, and so on, when a hydrocarbon is applied as a foaming agent.

To achieve the above mentioned goal, the present invention aims to restrain combustibility of the foamed thermal-insulating material and to prevent the release of halides, which are a cause of acid rain, by adding a non-halogenated organophosphorus compound as an additive to the raw materials of the foamed thermal-insulating material which includes a hydrocarbon foaming agent such as pentane and/or cyclopetane.

In addition, a non-halogenated organophosphorus compound having a molecular weight over 150 as an additive with an OH group as a functional group is reacted and polymerized to an organic polyisocyanates in order to eliminate the possibilities of phosphor corrosion by free ionization to the metal pipes which are disposed inside of the insulated structure and to eliminate the possibilities of food contamination by phosphorus transfer through the plastic board.

Also, organic polyisocyanates that have been polymerized by a non-halogenated organophosphorus compound with active hydrogen are used as the raw materials of the foamed thermal-insulating material which includes a hydrocarbon such as pentane and/or cyclopentane as a foaming agent, in order to restrain combustibility of the foamed thermal-insulating material and to prevent the release of halides, which are a cause of acid rain, caused by the burning of the foamed material for disposal purposes. Further, this composition helps eliminate the possibilities of phosphor corrosion by free ionization to the metal pipes which are disposed inside of the insulated structure, and helps eliminate the possibilities of food contamination by phosphorus transfer through the plastic board despite retaining a phosphor component in the urethane resin.

A Polyol component including at least 5% or more of polyether-polyol, which is obtained from the additional polymerization of ethylenediamine and alkylene-oxide with a hydroxyl value of 350–650 mg KOH/g, is used as the raw materials for the foamed thermal-insulating material which includes a hydrocarbon such as pentane and/or cyclopentane as a foaming agent, in order to improve mutual solubility between a polyol component and a hydrocarbon foaming agent. This maintains the quality of the foamed thermal-insulating material by having a foaming agent equally soluble to the raw material components. Further, this composition improves the insulating efficiency of the foamed thermal-insulating material by raising the addition ratio of a hydrocarbon foaming agent to lower amounts of a co-foaming agent, such as water, and by lowering the ratio of carbonic acid gas, which has a higher gaseous thermal conductivity, among other gas components being retained in the bubbles of the foamed thermal-insulating material.

An acid-blocked catalyst is preferred as a catalyst for the raw materials of the foamed thermal-insulating material which includes a hydrocarbon such as pentane and/or cyclopentane as a foaming agent. This catalyst is used in order to catalytic activation from the beginning to the middle stages of the reaction and by raising the temperature of the pre-mixed raw materials from 5 to 10 degrees Celsius. At this point, due to the use of an acid-blocked catalyst, the foamed thermal-insulating material has a good reaction balance since catalytic activation from the beginning to the middle stages of the reaction is distinctly lowered and the cream time and the gel time will not be extremely shortened in spite of the raised temperature of the raw materials. Also, the problem of filling the cabinets up with foam is eliminated because the foam viscosity is lowered and the uprising-process of foam viscosity is moderated by lowering catalytic activation in the early stage of reaction to make more foam available. In addition, a large amount of catalyst is not needed and a usual prescription of additive is maintained. Accordingly, there are no filling problems such as found with cure and adhesive foams, and a foamed thermal-insulating material with high quality is obtained.

DESCRIPTION OF THE PREFERRED EMBODIMENTS

Figure 1:
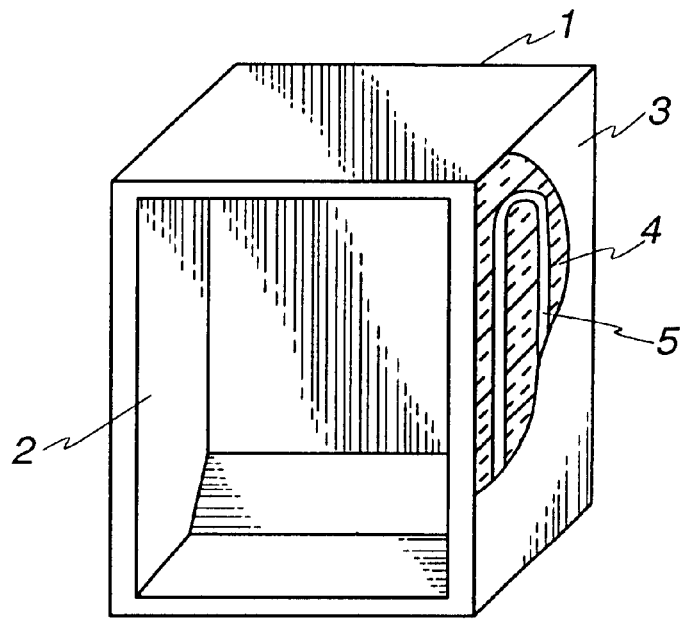
FIG. 1 is a perspective view of an insulated structure with a portion in section according to an illustrated operation of the present invention.
Figure 2:
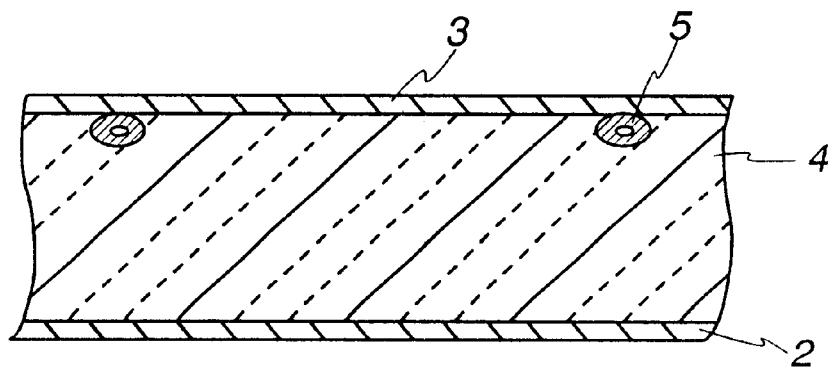
FIG. 2 is a cross-sectional view of the insulated structure according to the illustrated operation of the present invention.

The following text, referring to FIGS. 1 and 2, is an explanation of the operation of the present invention.

Referring to FIG. 1, the insulated structure (1) is formed into the space between a plastic board (2), which is made of material such as ABS, and a metal plate (3) by injection of a foamed thermal-insulating material created by foaming which is made of hard urethane foam (4). The copper pipes (5), which have circulating refrigerant, are disposed in the foamed thermal-insulating material (4).

Table 1 indicates a prescribed combination ratio of the raw materials of the foamed thermal-insulating material (4) for illustrated operation 1 and illustrated comparisons 1, 2, and 3.

pre-mix component. Then, the insulated structure (1) is formed by injection of this compounded pre-mix component and an isocyanate component, which are mixed by a prescribed combination ratio and are foamed in a high-pressure foaming machine, into the space between the plastic board (2) and metal plate (3) with a disposition of copper pipes (5).

In illustrated comparison 3, each raw material such as polyol, a foam stabilizer, a catalyst, the foaming agent B,

TABLE 1

|  | Illustrated Operation 1 | Illustrated Comparison 1 | Illustrated Comparison 2 | Illustrated Comparison 3 |
|---|---|---|---|---|
| Prescribed raw materials and Combination weight ratio | | | | |
| Polyol | 100 | 100 | 100 | 100 |
| Foam Stabilizer | 3 | 3 | 3 | 3 |
| Catalyst | 2 | 2 | 2 | 2 |
| Foaming Agent A | 15 | 15 | 15 | 0 |
| Foaming Agent B | 1 | 1 | 1 | 1 |
| Foaming Agent C | 0 | 0 | 0 | 32 |
| Additive A | 8 | 0 | 0 | 0 |
| Additive B | 0 | 0 | 5 | 0 |
| Isocyanate Component | 135 | 135 | 135 | 135 |
| Analyzed Outcome | | | | |
| Burning Time (second) | 75 | 40 | 85 | 70 |
| Corrosion of the Copper Pipes | no corrosion | no corrosion | corrosion | no corrosion |
| Phosphorus Transfer through Plastic Board | no transfer | no transfer | transfer | no transfer |

Referring to Table 1:
1) polyol is an aromatic amine polyether-polyol with a hydroxyl value of 460 mg KOH/g;
2) the foam stabilizer (the surfactant agent) is a silicon surface active agent F-335 from Shinetsu Kagaku Kogyo Kabushiki Gaisha;
3) the catalyst is Kaoraizer No. 1 from Kao Company;
4) the foaming agent A is cyclopentane;
5) the foaming agent B is pure water;
6) the foaming agent C is CFC11;
7) the additive A is a phosphorus organic compound having dibutyl-hydroxymethyl-phosphonate;
8) the additive B is tris (2-chlorethyl) phosphate which includes a halogen; and
9) the isocyanate component is an organic polyisocyanates having a crude MDI with amine equivalent 135.

In illustrated operation 1, each raw material such a polyol, a foam stabilizer, a catalyst, the foaming agent A, the foaming agent B, and the additive A, is mixed according to a prescribed combination ratio and is compounded as a pre-mix component. Then, the insulated structure (1) is formed by injection of this compounded pre-mix component and an isocyanate component, which are mixed by a prescribed combination ratio and are foamed in a high-pressure foaming machine, into the space between the plastic board (2) and metal plate (3) with a disposition of copper pipes (5).

In illustrated comparison 1, each raw material such as polyol, a foam stabilizer, a catalyst, the foaming agent A, and the foaming agent B, is mixed according to a prescribed combination ratio and is compounded as a pre-mix component. Then, the insulated structure (1) is formed by injection of this compounded pre-mix component and an isocyanate component, which are mixed by a prescribed combination ratio and are foamed in a high-pressure foaming machine, into the space between the plastic board (2) and metal plate (3) with a disposition of copper pipes (5).

In illustrated comparison 2, each raw material such as polyol, a foam stabilizer, a catalyst, the foaming agent A, the foaming agent B, and the additive B, is mixed according to a prescribed combination ratio and is compounded as a pre-mix component. Then, the insulated structure (1) is formed by injection of this compounded pre-mix component and an isocyanate component, which are mixed by a prescribed combination ratio and are foamed in a high-pressure foaming machine, into the space between the plastic board (2) and metal plate (3) with a disposition of copper pipes (5).

and the foaming agent C, is mixed according to a prescribed combination ratio and is compounded as a pre-mix component. Then, the insulated structure (1) is formed by injection of this compounded pre-mix component and an isocyanate component, which are mixed by a prescribed combination ratio and are foamed in a high-pressure foaming machine, into the space between the plastic board (2) and metal plate (3) with a disposition of copper pipes (5).

Illustrated comparison 1 uses no additives. Illustrated comparison 2 added tris(2-chlorethyl)phosphate including a halogen as an additive. Illustrated comparison 3 uses CFC11 as a foaming agent.

The degree of combustibility for each foamed thermal-insulating material (4) is shown in Table 1 under the heading "Analyzed Outcome". The degree of combustibility is provided as a burn time, measured in seconds, listed in a combustibility test item of JIS-A9514.

The Analyzed Outcome of Table 1 also indicates whether corrosion of the copper pipes (5) and phosphorus transfer through the plastic board (2) occurs when the insulated structure (1) has been operated for 3 months under the conditions of 40° C. and 95%RH.

As clearly shown in the Analyzed Outcome of Table 1, the combustibility for the resin part of the foamed thermal-insulating material (4) is restrained when dibutyl-hydroxymethyl-phosphonate (Additive A) (the non-halogenated organophosphorus compound which has a molecular weight over 224 as an additive with an OH group as a functional group) is used as an additive (illustrated operation 1). Further, the degree of combustibility becomes almost same as that of illustrated comparison 3 (using CFC11 as the foaming agent) even if the hydrocarbon cyclopentane, which is combustible, is used as the foaming agent.

As a result, it eliminates the risk of fire or spread of fire, contributes to the solution of global environmental issues such as the destruction of the ozone layer, and generally makes the product available to be safely used. In addition, phosphor corrosion by free ionization to the copper pipes (5) is eliminated since dibutyl-hydroxymethyl-phosphonate, which has a molecular weight over 224 with an OH group as a functional group, is reacted and polymerized to an organic polyisocyanates. Even under high humidity conditions, where moisture penetration from the outside attaches to the copper pipes to cause phosphor corrosion, there aren't any corrosion problems. In other words, the restraint of free ionization of phosphor due to the polymerization enhances product reliability for long term use.

Furthermore, since there is no phosphorus transfer through the plastic board (2), there are no worries of food contamination, and food can be preserved for extended periods of time.

On the other hand, illustrated comparison 1, which uses no additives, is not suitable because of the increase of the combustibility speed when it is compared to illustrated comparison 3, which uses CFC 11 as the foaming agent. Also, illustrated comparison 2, which added tris(2-chlorethyl)phosphate including a halogen as an additive, is not suitable because of the corrosion of the copper pipes (5) and the phosphorus transfer through the plastic board (2).

The following is an explanation pertaining to illustrated operation 2 of the invention.

Table 2 indicates a prescribed combination ratio of the raw materials of the foamed thermal-insulating material (4) for illustrated operation 2 and illustrated comparisons 4, 5, and 6.

TABLE 2

|  | Illustrated Operation 2 | Illustrated Comparison 4 | Illustrated Comparison 5 | Illustrated Comparison 6 |
|---|---|---|---|---|
| Prescribed raw materials and Combination weight ratio | | | | |
| Polyol | 100 | 100 | 100 | 100 |
| Foam Stabilizer | 3 | 3 | 3 | 3 |
| Catalyst | 2 | 2 | 2 | 2 |
| Foaming Agent A | 15 | 15 | 15 | 0 |
| Foaming Agent B | 1 | 1 | 1 | 1 |
| Foaming Agent C | 0 | 0 | 0 | 32 |
| Isocyanate Component A | 148 | 0 | 0 | 0 |
| Isocyanate Component B | 0 | 135 | 0 | 135 |
| Isocyanate Component C | 0 | 0 | 143 | 0 |
| Analyzed Outcome | | | | |
| Burning Time (second) | 75 | 40 | 85 | 70 |
| Corrosion of the Copper Pipes | no corrosion | no corrosion | corrosion | no corrosion |
| Phosphorus Transfer through Plastic Board | no transfer | no transfer | transfer | no transfer |

Referring to Table 2:
1) polyol is an aromatic amine polyether-polyol with a hydroxyl value of 460 mg KOH/g;
2) the foam stabilizer is a silicon surface active agent F-335 from Shinetsu Kagaku Kogyo Kabushiki Gaisha;
3) the catalyst is Kaoraizer No. 1 from Kao Company;
4) the foaming agent A is cyclopentane;
5) the foaming agent B is pure water;
6) the foaming agent C is CFC11;
7) the isocyanate component A is an organic polyisocyanates having a crude MDI with amine equivalent 135, which is previously polymerized with combination ratio 5% of a phosphorus organic compound having dibutyl-hydroxymethyl-phosphonate with a molecular weight 224 and a hydroxyl value of 250 mg KOH/g;
8) the isocyanate component B is an organic polyisocyanates having a crude MDI; and
9) the isocyanate component C is an organic polyisocyanates having combination ratio of 5% of tris (2-chlorethyl) phosphate including a halogen.

In illustrated operation 2, each raw material such as polyol, a foam stabilizer, a catalyst, the foaming agent A, and the foaming agent B, is mixed according to a prescribed combination ratio and is compounded as a pre-mix component. Then, the insulated structure (1) is formed by injection of this compounded pre-mix component and an isocyanate component A, which are mixed by a prescribed combination ratio and are foamed in a high-pressure foaming machine, into the space between the plastic board (2) and metal plate (3) with a disposition of copper pipes (5).

In illustrated comparison 4, each raw material such as polyol, a foam stabilizer, a catalyst, the foaming agent A, and the foaming agent B, is mixed according to a prescribed combination ratio and is compounded as a pre-mix component. Then, the insulated structure (1) is formed by injection of this compounded pre-mix component and an isocyanate component B, which are mixed by a prescribed combination ratio and are foamed in a high-pressure foaming machine, into the space between the plastic board (2) and metal plate (3) with a disposition of copper pipes (5).

In illustrated comparison 5, each raw material such a polyol, a foam stabilizer, a catalyst, the foaming agent A, and the foaming agent B, is mixed according to a prescribed combination ratio and is compounded as a pre-mix component. Then, the insulated structure (1) is formed by injection of this compounded pre-mix component and an isocyanate component C, which are mixed by a prescribed combination ratio and are foamed in a high-pressure foaming machine, into the space between the plastic board (2) and metal plate (3) with a disposition of copper pipes (5).

In illustrated comparison 6, each raw material such as polyol, a foam stabilizer, a catalyst, the foaming agent B, and the foaming agent C, is mixed according to a prescribed combination ratio and is compounded as a pre-mix component. Then, the insulated structure (1) is formed by injection of this compounded pre-mix component and an isocyanate component B, which are mixed by a prescribed combination ratio and are foamed in a high-pressure foaming machine, into the space between the plastic board (2) and metal plate (3) with a disposition of copper pipes (5).

Illustrated operation 2 uses isocyanate component A and cyclopentane as the foaming agent. Illustrated comparison 4 uses the isocyanate component B instead of the isocyanate component A. Illustrated comparison 5 uses the isocyanate component C instead of the isocyanate component A. Illustrated comparison 6 uses CFC11 as a foaming agent instead of cyclopentane and the isocyanate component B instead of the isocyanate component A.

The degree of combustibility for each foamed thermal-insulating material (4) is shown in Table 2 under the heading "Analyzed Outcome". The degree of combustibility is provided as a burn time, measure in seconds, listed in a combustibility test item of JIS-A9514.

The Analyzed Outcome of Table 2 also indicates whether corrosion of the copper pipes (5) and phosphorus transfer through the plastic board (2) occurs when the insulated structure (1) has been operated for 3 months under the conditions of 40° C. and 95%RH.

As clearly shown in the Analyzed Outcome of Table 2, the combustibility for the resin part of the foamed thermal-insulating material (4) is restrained when an organic polyisocyanates with a crude MDI which has been polymerized by dibutyl-hydroxymethyl-phosphonates (isocyanate component A) (the non-halogenated organophosphorus compound which has a molecular weight over 224 as an additive with active hydrogen) is used as the isocyanate component (illustrated operation 2). Further, the degree of combustibility becomes almost same as that of illustrated comparison 6 (using CFC11 as the foaming agent) even if the hydrocarbon cyclopentane, which is combustible, is used as the foaming agent.

As a result, it eliminates the risk of fire or spread of fire, contributes to the solution of global environmental issues such as the destruction of the ozone layer, and generally makes the product available to be safely used. In addition, phosphor corrosion by free ionization to the copper pipes (5) is eliminated since dibutyl-hydroxymethyl-phosphonate is previously reacted and polymerized to an organic polyisocyanates. Even under high humidity conditions, where moisture penetration from the outside attaches to the copper pipes to cause phosphor corrosion, there aren't any corrosion problems. In other words, the restraint of free ionization of phosphor due to the pre-polymerization to an organic polyisocyanates enhances product reliability for long term use.

Furthermore, since there is no phosphorus transfer through the plastic board (2), there are no worries of food contamination, and food can be preserved for extended periods of time.

On the other hand, illustrated comparison 4, which uses an organic polyisocyanates having a crude MDI as the isocyanate component, is not suitable because of the increase of the combustibility speed when it is compared to illustrated comparison 6, which uses CFC 11 as the foaming agent. Also, illustrated comparison 5, which uses an organic polyisocyanates having a combination ratio of 5% of tris(2-chlorethyl)phosphate including a halogen as the isocyanate component, is not suitable because of the corrosion of the copper pipes (5) and the phosphorus transfer through the plastic board (2).

The following is an explanation pertaining to illustrated operation 3 of the invention.

Table 3 indicates a prescribed combination ratio of the raw materials of the foamed thermal-insulating material (4) for illustrated operation 3 and illustrated comparisons 7 and 8.

TABLE 3

|  | Illustrated Operation 3 | Illustrated Comparison 7 | Illustrated Comparison 8 |
| --- | --- | --- | --- |
| Prescribed raw materials and Combination weight ratio | | | |
| Polyol A | 20 | 0 | 0 |
| Polyol B | 80 | 100 | 100 |
| Foam Stabilizer | 1.5 | 1.5 | 1.5 |
| Catalyst | 2 | 2 | 2 |
| Foaming Agent A | 28 | 28 | 18 |
| Foaming Agent B | 0.5 | 0.5 | 1.5 |
| Isocyanate Component | 127 | 127 | 133 |
| Analyzed Outcome | | | |
| Thermal Conductivity (W/mK) | 0.0185 | 0.0185 | 0.0195 |
| Carbonic acid gas in the foam Density (kg/cm3) | 50–60 | 50–60 | 70–80 |
| Maximum | 36 | 40 *1 | 36 |
| Minimum | 35 | 32 *2 | 35 |
| Filling property of foam into the insulated box structure | good | *1 leak *2 unfilled | good |

Referring to Table 3:
1) polyol A is a polyether-polyol which is obtained from the additional polymerization of ethylenediamine and propylene-oxide with a hydroxyl value of 400 mg KOH/g;
2) polyol B is an aromatic amine polyether-oxide with a hydroxyl value of 460 mg KOH/g;
3) the foam stabilizer is a silicon surface active agent F-335 from Shinetsu Kagaku Kogyo Kabushiki Gaisha;
4) the catalyst is Kaoraizer No. 1 from Kao Company;
5) the foaming agent A is n-pentane;
6) the foaming agent B is pure water; and
7) the isocyanate component is an organic polyisocyanates having a crude MDI with amine equivalent 135.

In illustrated operation 3, each raw material such as polyol A, polyol B, a foam stabilizer, a catalyst, the foaming agent A, and the foaming agent B is mixed according to a prescribed combination ratio and is compounded as a pre-mix component. Then, the insulated box structure (1) is formed by injection of this compounded pre-mix component and an isocyanate component, which are mixed by a prescribed combination ration and are foamed in a high-pressure foaming machine, into the space between ABS material (2) inside the box and metal plate (3) outside the box.

In illustrated comparison 7, each raw material such as polyol B, a foam stabilizer, a catalyst, the foaming agent A, and the foaming agent B, is mixed according to a prescribed combination ratio and is compounded as a pre-mix component. Then, the insulated box structure (1) is formed by injection of this compounded pre-mix component and an isocyanate component, which are mixed by a prescribed combination ratio and are foamed in a high-pressure foaming machine, into the space between ABS material (2) inside the box and metal plate (3) outside the box.

In illustrated comparison 8, each raw material such as polyol B, a foam stabilizer, a catalyst, the foaming agent A, and the foaming agent B, is mixed according to a prescribed combination ratio and is compounded as a pre-mix component. Then, the insulated box structure (1) is formed by injection of this compounded pre-mix component and an isocyanate component, which are mixed by a prescribed combination ratio and are foamed in a high-pressure foaming machine, into the space between ABS material (2) inside the box and metal plate (3) outside the box.

As shown in Table 3, neither illustration comparison 7 nor illustrated comparison 8 use ethylenediamine polyether as the polyol, however, illustrated comparison 8 increased the amount of pure water as a co-foaming agent.

Distinctive outcomes of thermal conductivity and density of the thermal-insulating material for illustrated operation 3, illustrated comparison 7 and illustrated comparison 8 are shown in Table 3.

As clearly shown in the Analyzed Outcome of Table 3, the density quality for the foamed thermal-insulating material of illustrated operation 3, which is foamed in a high-pressure foaming machine, is maintained at a proper level when n-pentane, which has poor mutual solubility, is utilized as a foaming agent. Therefore, the insulated box structure with the foamed thermal-insulating material according to illustration operation 3 produces the same excellent quality as the foamed thermal-insulating material using CFC11 as the foaming agent, which is halogenated hydrocarbon foaming agent.

Polyether-polyol, which has a good mutual solubility to a hydrocarbon foaming agent and is equally soluble in the raw material components, is obtained from the additional polymerization of ethylenediamine and propylene-oxide with a hydroxyl value of 400 mg KOH/g and added as a part of the polyol components. Therefore, problems such as separation of a hydrocarbon foaming agent in the material tank of a high-pressure foaming machine is eliminated. Also, the foamed thermal-insulating material with a proper quality level is obtained by raising the addition ratio of a hydrocarbon foaming agent to lower the amount of co-foaming agent, such as water, which lowers the amount of carbonic acid gas, which has a higher gaseous thermal conductivity, among the other gas components being retained in the bubbles of the foamed thermal-insulating material. This is apparent in comparing illustrated operation 3 with illustrated comparison 7.

As a result, the foamed thermal-insulating material produced per illustrated operation 3 contributes to the solution of global environmental issues, such as the destruction of the ozone layer, by using a hydrocarbon foaming agent which has a zero coefficient in the destruction of the ozone layer. Moreover, it also contributes to improve the quality and to save energy by having the same excellent insulating efficiency as that of the present halogenated hydrocarbon foaming agent.

In addition, the foamed thermal-insulating material maintains a proper quality level during the production process and provides an excellent quality in the insulated box structure, maintaining the same excellent insulating efficiency as that of the present halogenated hydrocarbon foaming agent.

As shown in illustrated comparison 7, when the same amount of the hydrocarbon foaming agent used in illustrated operation 3 is used without a polyether of ethylenediamine being added, the density of the thermal-insulating material foamed in a high-pressure foaming machine is not maintained and problems such as a leak and unfilled parts of the foamed thermal-insulating material in the insulated box structure occur. Also, as shown in illustrated comparison 8, when water as a co-foaming agent is increased, there is little improvement of insulating efficiency due to the increase in the amount of carbonic acid gas in the bubbles.

The following is an explanation pertaining to illustrated operations 4–7 of the invention.

Table 4 indicates a prescribed combination ratio of the raw materials of the foamed thermal-insulating material (4) for illustrated operations 4–7 and illustrated comparisons 9–12.

TABLE 4

| | Illustrated Operation | | | | Illustrated Comparison | | | |
|---|---|---|---|---|---|---|---|---|
| | 4 | 5 | 6 | 7 | 9 | 10 | 11 | 12 |
| Prescribed raw materials and Combination weight ratio | | | | | | | | |
| Polyol | 100 | 100 | 100 | 100 | 100 | 100 | 100 | 100 |
| Foaming Stabilizer | 2.0 | 2.0 | 2.0 | 2.0 | 2.0 | 2.0 | 2.0 | 2.0 |
| Catalyst No. 31 | 1.5 | 1.0 | — | — | 2.2 | 2.2 | 1.7 | 1.7 |
| Catalyst No. 55 | 1.5 | 2.0 | 3.0 | 3.0 | — | — | — | 0.5 |
| Water | 2.0 | 2.0 | 2.0 | 2.0 | 2.0 | 2.0 | 2.0 | 2.0 |
| Cyclopentane | 18 | 18 | 18 | 18 | 18 | 18 | 18 | 18 |
| Isocyanate | 148 | 148 | 148 | 148 | 148 | 148 | 148 | 148 |
| Pre-mix Temperature (° C.) | 27 | 27 | 27 | 32 | 22 | 27 | 27 | 27 |
| Reactivity (GT) (second) | 30 | 32 | 35 | 30 | 30 | 25 | 30 | 28 |
| Free Density (Kg/m$^3$) | 27.0 | 27.0 | 27.0 | 26.3 | 28.5 | 27.0 | 27.0 | 27.0 |
| Quality of the Insulated box structure | | | | | | | | |
| Expansion of insulated box (%) | 2.0 | 2.0 | 2.0 | 2.0 | 3.0 | 3.0 | 7.0 | 4.0 |
| Peel-off of board after | no | no | no | no | no | no | yes | no |

TABLE 4-continued

|  | Illustrated Operation | | | | Illustrated Comparison | | | |
| --- | --- | --- | --- | --- | --- | --- | --- | --- |
|  | 4 | 5 | 6 | 7 | 9 | 10 | 11 | 12 |
| cold thermal cycles Filling property of foam into the insulated box | good | good | good | good | good | poor | good | good |

Referring to Table 4:
1) polyol is a compound of aromatic amine polyether-polyol and polyether-polyol of ethylenediamine with a total hydroxyl value of 460 mg KOH/g;
2) the foam stabilizer is a silicon surface active agent F-335 from Shinetsu Kagaku Kogyo Kabushiki Gaisha;
3) the catalysts are Kaoraizer No. 31 and No. 55 from Kao Company; and
4) the foaming agent is cyolopentane.

Each raw material is mixed according to a prescribed combination ratio and is compounded as a pre-mix component.

In addition, the isocyanate component is an organic polyisocyanates having a polymeric MDI with amine equivalent 135.

The insulated box structure (1) is formed by injection of this compounded pre-mix component and an isocyanate component, which are mixed by a prescribed combination ratio and are foamed in a high-pressure foaming machine, into the space between ABS material (2) inside the box and metal plate (3) outside the box.

The pre-mix component, which is mixed with a foaming agent, polyether-polyol, and a mixed material as a helping agent, is formed by using a static mixer.

The four test measurements provided in Table 4 are as follows:
1) the free density in Kg/m$^3$ of the urethane foam which is foamed according to prescribed urethane raw material data in Table 4;
2) the filling property of the foam into the insulated box structure which is foamed at the free density aiming for a core density of 34 kg/cm$^3$;
3) the expansion of the insulated box structure which measures the degree of cure foams at the time of the operation; and
4) the peeling off of the board after thermal and cold cycles, which is the peeling off of urethane foam from the ABS board inside the box and metal board outside the box after the insulated box structure has been operated in 5 cold and thermal cycles of 30° C. for 12 hours and 60° C. for 12 hours.

Each result, such as the case without an increase of raw material temperature, the case without applying Kaoraizer No. 55 which is an acid-blocked catalyst, and the case using Kaoraizer No. 55 with under 50% by weight of a catalyst component, are shown in Table 4 as illustrated comparisons 9–12.

As is clearly shown in the "Quality of the Insulated box structure" of Table 4, when Kaoraizer No. 55 with under 50% by weight of a catalyst component is applied, the problems of filling the insulated box with the foam and reactivity are eliminated even when a low-density foam is set and the temperature of the pre-mixed raw materials is raised from 5 to 10 degrees centigrade, because an acid-blocked catalyst, which is comprised of both a first tertiary amine polymer and a second tertiary amine polymer with over 50% by weight of a catalyst component being partially or entirely neutralized by carboxylic acid, is used as a catalyst component.

Therefore, when cyclopentane is used as a foaming agent, lowering the foam density becomes possible by raising the temperature of the raw materials without a large change of a present prescription instead of developing new mutual soluble raw materials.

When an acid-blocked catalyst, which is comprised of both a first tertiary amine polymer and a second tertiary amine polymer with under 50% by weight of a catalyst component being partially or entirely neutralized by carboxylic acid, is used as a catalyst component, there are problems of worse cure and adhesive foams since the adjustment of reactivity becomes necessary due to a decrease of catalyst amount. Also, early reactivity occurs and the filling property of the foam into the insulated box structure becomes worse without the adjustment of reactivity.

As a result, cyclopentane (one of a hydrocarbon being used as a urethane foaming agent), which helps to solve global environmental issues because of its zero coefficient to the destruction of the ozone layer and because of its small influences to global warming, is used without a large prescription change in order to provide the high quality foamed thermal-insulating material which has many kinds of foam characteristics presently being used and also to provide the high quality insulated box structure in which the foamed thermal-insulating material is filled by injection.

POSSIBLE PRODUCTION USE

As explained, the foamed thermal-insulating material and the insulated structure filled up with the foamed thermal-insulating material in the present invention are not inferior to the present foamed thermal-insulating material made by a CFC11 foaming agent in terms of combustibility safety, thermal-insulating efficiency quality, etc., when a hydrocarbon is applied as a urethane foaming agent, and also helps to solve global environmental issues because of its zero coefficient as to the destruction of the ozone layer and because of its negligible influence on global warming.

What is claimed is:
1. A foamed thermal-insulating material formed by foaming, said foamed thermal-insulating material comprising:
   a) polyol;
   b) a foam stabilizer;
   c) a catalyst;
   d) a foaming agent having at least one component of hydrocarbon; and
   e) an isocyanate component comprising organic polyisocyanates polymerized by a non-halogenated organophosphorous compound with active hydrogen.

2. A foamed thermal-insulating material formed by foaming, said foamed thermal-insulating material comprising:
   a) polyol, wherein the polyol comprises a polyol component including at least 5% polyether-polyol with a hydroxyl value of 350–650 mg KOH/g;
   b) a foam stabilizer;
   c) a catalyst;
   d) a foaming agent including a hydrocarbon; and
   e) an isocyanate component, wherein the isocyanate component comprises organic polyisocyanates polymerized by a non-halogenated organophosphorous compound with active hydrogen.

3. A foamed thermal-insulating material formed by foaming, said foamed thermal-insulating material comprising:
   a) polyol;
   b) a foam stabilizer;
   c) a catalyst; the catalyst comprising an acid-blocked catalyst, wherein said acid-blocked catalyst comprises: a first tertiary amine polymer, and a second tertiary amine polymer with over 50% by weight of the catalyst component being partially or entirely neutralized by carboxylic acid;
   d) a foaming agent including a hydrocarbon; and
   e) an isocyanate component, wherein the isocyanate component comprises organic polyisocyanates polymerized by a non-halogenated organophosphorous compound with active hydrogen.

4. A foamed thermal-insulating material formed by foaming, said foamed thermal-insulating material comprising:
   a) polyol;
   b) a foam stabilizer;
   c) a catalyst;
   d) a foaming agent including a hydrocarbon; and
   e) organic polyisocyanates polymerized by a non-halogenated organophosphorus compound with active hydrogen.

5. The foamed thermal-insulating material according to claim 4, wherein the non-halogenated organophosphorus compound has a molecular weight under 400.

6. The foamed thermal-insulating material according to claim 5, wherein the polyol comprises a polyol component including at least 5% of polyether-polyol with a hydroxyl value of 350–650 mg KOH/g.

7. The foamed thermal-insulating material according to claim 6, wherein the polyol component is obtained from the polymerization of ethylenediamine and alkylene-oxide.

8. The foamed thermal-insulating material according to claim 4, wherein the non-halogenated organophosphorus compound has a molecular weight over 150 with an OH group as a functional group.

9. The foamed thermal-insulating material according to claim 8, wherein the foaming agent including a hydrocarbon comprises a foaming agent having at least one component of hydrocarbon.

10. The foamed thermal-insulating material according to claim 4, wherein the catalyst comprises:
   a first tertiary amine polymer; and
   a second tertiary amine polymer with over 50% by weight of a catalyst component being partially or entirely neutralized by carboxylic acid.

11. The foamed thermal-insulating material according to claim 4, wherein the hydrocarbon comprises pentane.

12. The foamed thermal-insulating material according to claim 4, wherein the hydrocarbon comprises cyclopentane.

* * * * *